US006832161B1

United States Patent
Moore

(10) Patent No.: US 6,832,161 B1
(45) Date of Patent: Dec. 14, 2004

(54) METHOD FOR ATTENUATING WATER LAYER MULTIPLES

(75) Inventor: Ian Moore, Shelly, WA (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/644,565

(22) Filed: Aug. 15, 2003

(51) Int. Cl.[7] .................................................. G01V 1/28
(52) U.S. Cl. ......................................... 702/17; 703/10
(58) Field of Search ............................... 702/17; 367/43, 367/38, 63, 73; 703/10

(56) References Cited

U.S. PATENT DOCUMENTS

| | | | | |
|---|---|---|---|---|
| 4,594,693 A | * | 6/1986 | Pann et al. .................... | 367/43 |
| 4,665,510 A | | 5/1987 | Foster et al. .................. | 367/21 |
| 4,760,563 A | | 7/1988 | Beylkin ........................ | 367/73 |
| 5,189,644 A | * | 2/1993 | Wood ........................... | 367/38 |
| 5,587,965 A | | 12/1996 | Dragoset, Jr. et al. ........ | 367/24 |
| 5,970,023 A | * | 10/1999 | Chambers et al. ............. | 367/63 |
| 6,018,500 A | * | 1/2000 | Chambers .................... | 367/73 |
| 6,094,620 A | | 7/2000 | Gasparotto et al. ........... | 702/14 |
| 6,101,448 A | | 8/2000 | Ikelle et al. .................. | 702/17 |
| 6,169,959 B1 | | 1/2001 | Dragoset, Jr. ................. | 702/17 |
| 6,208,587 B1 | | 3/2001 | Martin ......................... | 367/50 |
| 6,507,787 B1 | | 1/2003 | Filpo Ferreira Da Silva et al. ............................ | 702/1 |
| 6,636,810 B1 | * | 10/2003 | Moore et al. .................. | 702/17 |

* cited by examiner

Primary Examiner—John Barlow
Assistant Examiner—Victor J. Taylor
(74) Attorney, Agent, or Firm—Moser, Patterson & Sheridan

(57) ABSTRACT

A method for attenuating water layer multiples from a gather of seismic data traces. The method includes predicting a plurality of receiver side water layer multiples in the gather of seismic data traces using a convolutional operator derived from a water layer model, adaptively subtracting the receiver side water layer multiples from the gather of seismic data traces, predicting a plurality of source side water layer multiples using the convolutional operator derived from the water layer model, and adaptively subtracting the receiver side water layer multiples and the source side water layer multiples from the gather of seismic data traces to generate a plurality of primaries in the gather of seismic data traces.

20 Claims, 4 Drawing Sheets

METHOD FOR ATTENUATING WATER LAYER MULTIPLES

BACKGROUND OF THE INVENTION

1. Field of the Invention

Embodiments of the present invention generally relate to the field of seismic data processing, and more specifically to prediction and removal of multiples in seismic reflection surveying.

2. Description of the Related Art

Seismic surveying is a method for determining the structure of subterranean formations in the earth. Seismic surveying typically utilizes seismic energy sources which generate seismic waves and seismic receivers which are strategically positioned to detect the seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The reflected seismic waves are detected by the seismic receivers, which convert the reflected waves into representative electrical signals. The signals are typically transmitted by electrical, optical, radio or other means to devices which record the signals. Through analysis of the recorded signals, the shape, position and composition of subterranean formations can be determined.

Land seismic surveying is a method for determining the structure of subterranean formations beneath the surface of the earth. Typically, the seismic energy source used in land seismic surveying is an apparatus capable of delivering a series of impacts or mechanical vibrations to the surface of the earth or the detonation of an explosive charge near the surface of the earth, while the seismic receiver used is a motion sensor, such as a geophone or an accelerometer. The seismic sources and seismic receivers are typically placed on the surface of the earth, although either source or receiver may be placed in a borehole for vertical seismic profiling. Both the seismic sources and the seismic receivers are typically repositioned to cover the survey area.

Marine seismic surveying is a method for determining the structure of subterranean formations underlying bodies of water. Marine seismic surveying typically utilizes seismic energy sources and seismic receivers located in the water and are typically towed behind a vessel or positioned on the water bottom from a vessel. The energy source is typically an explosive device or compressed air system that generates seismic energy, which are configured to propagate as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Both the sources and receivers may be repositioned to cover the survey area.

Seismic waves, however, do not reflect only from the interfaces between subterranean formations, as would be desired. Seismic waves also reflect from the water bottom and the water surface, and the resulting reflected waves themselves continue to reflect. Waves that reflect multiple times are called "multiples". Waves that reflect multiple times in the water layer between the water surface above and the water bottom below are called "water bottom multiples" or "water layer multiples." Water layer multiples have long been recognized as a problem in marine seismic processing and interpretation, and consequently, multiple attenuation methods have been developed to handle water layer multiples.

In general, current multiple attenuation methods can be roughly divided into two categories: filtering methods and wave-equation prediction methods. Filtering methods rely on periodicity of the multiples or on significant velocity differences between primary reflections ("primaries") and multiples. Primary reflections are those seismic waves that have reflected only once, from the water bottom or an interface between subterranean formations, before being detected by a seismic receiver. Predictive deconvolution is a filtering method that assumes that multiples are periodic while primaries are not. This assumption is usually met for data from water depths less than 500 msec (approximately 1,200 feet) and approximately layered subsurface geology. In areas of water depths greater than 500 msec where the velocity difference between primaries and multiples are significant, velocity-filtering methods such tau-p and f-k filtering can be used, where the variable f represents frequency, k represents the wavenumber, p represents the ray parameter, and tau represents the zero offset intercept time.

However, filtering methods generally require determination, or at least an educated guess, of wave propagation velocities in the subsurface media through which the reflected seismic waves pass in their journey from the seismic source to a receiver. These velocities can differ significantly from one type of medium to another. In addition, predictive deconvolution often leads to inadvertent removal of primaries in the process of removing the multiples. Moreover, predictive doconvolution often fails to take into account the nonlinear factor in the reflectivity, which are generally caused by peg-leg multiples.

Wave-equation methods generally use the physical wave-propagation phenomenon to predict and subtract multiples from data. Wave-equation methods can be very accurate, but also very expensive and time-consuming to use compared to filtering methods. Wave-equation methods exploit the fact that primaries and multiples are physically related. Wave-equation methods generally can handle complex geometries and need little or no information about the properties of the subsurface.

Some wave-equation methods, however, require structural information, i.e., information about the subsurface structure, the determination of which is the reason for doing seismic exploration in the first place. Other wave-equation methods require the shape of the source wavelet that will not be a pure delta function because of reverberations and frequency bandwidth limitation. Some wave-equation methods require both structural and source wavelet information. If the shape of the source wavelet is not accounted for, i.e., it is ignored, predicted multiples will not match actual multiples and attempts to remove multiples will fail.

Therefore, a need exists in the art for a method of accurately predicting and removing multiples in a gather of seismic data traces.

SUMMARY OF THE INVENTION

Embodiments of the present invention are generally directed to a method for attenuating water layer multiples from a gather of seismic data traces. The method includes predicting a plurality of receiver side water layer multiples in the gather of seismic data traces using a convolutional operator derived from a water layer model, adaptively subtracting the receiver side water layer multiples from the gather of seismic data traces, predicting a plurality of source side water layer multiples using the convolutional operator derived from the water layer model, and adaptively subtracting the receiver side water layer multiples and the source side water layer multiples from the gather of seismic data traces to generate a plurality of primaries in the gather of seismic data traces.

In one embodiment, the method includes forming the gather of seismic data traces in a t-x domain, transforming the gather of seismic data traces from the t-x domain to a tau-p domain, convolving the gather of seismic data traces with a convolutional operator to predict a first set of water layer multiples in the gather of the seismic data traces, adaptively subtracting the first set of water layer multiples from the gather of seismic data traces, removing a water bottom primary from the gather of seismic data traces, convolving the convolutional operator with the gather of seismic data traces after the first set of water layer multiples has been adaptively subtracted from the seismic data traces and after the water bottom primary has been removed from the gather of seismic data traces to predict a second set of water layer multiples in the gather of seismic data traces, adding the first set of water layer multiples to the second set of water layer multiples, transforming the sum of the first set of water layer multiples and the second set of water layer multiples from the tau-p domain to the t-x domain, and adaptively subtracting the transformed sum of the first set of water layer multiples and the second set of water layer multiples from the gather of seismic data traces in the t-x domain to generate a plurality of primaries in the gather of seismic data traces.

Embodiments of the present invention are also directed to a method for generating a convolutional operator configured to be applied to a gather of seismic data traces. The method includes generating an estimated value of a zero offset two-way travel time in a water layer and an estimated value of a water bottom reflectivity from a water layer model, and computing a convolutional operator using the estimated values of the zero offset two-way travel time and the water bottom reflectivity.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1:
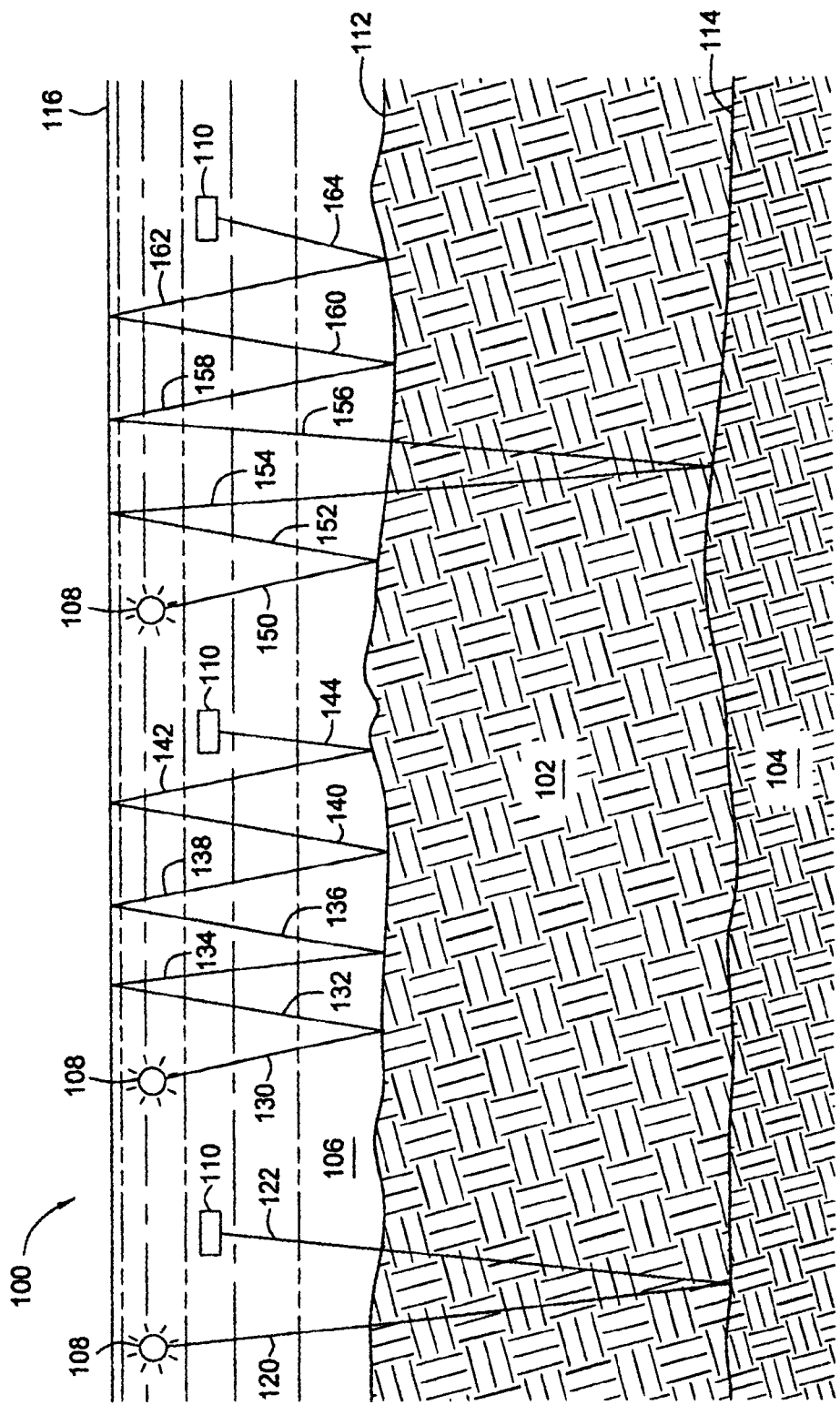
FIG. 1 illustrates a schematic drawing of marine seismic surveying.

FIG. 1 shows a schematic drawing of marine seismic surveying 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the body of water 106 toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as an interface 114 between formations 102 and 104. When the reflected waves traveling upward reach the water/air interface at the water surface 116, a majority portion of the waves reflects downward. Continuing in this fashion, seismic waves can reflect multiple times between the water bottom 112 or formation interfaces below and the water surface 116 above. Each time the reflected waves propagate past the position of a seismic receiver 110, the receiver 110 senses the reflected waves and generates representative signals.

Primary reflections are those seismic waves that have reflected only once, from the water bottom 112 or an interface between subterranean formations, before being detected by a seismic receiver 110. Primary reflections contain the desired information about the subterranean formations which marine seismic surveying seeks. An example of a primary reflection is shown in FIG. 1 by raypaths 120 and 122. Seismic waves are generated by a seismic source 108 and a portion of the waves travels downward through the body of water 106 and into the subterranean formation 102 along raypath 120. A portion of the seismic waves reflects from the interface 114 between formations 102 and 104. The reflected waves travel upward through the formation 102 and back into the body of water 106 along raypath 122. The reflected waves travel past a receiver 110, which detects the waves and generates a representative signal.

Water layer multiples are those waves that have reflected multiple times between the water surface 116 and the water bottom 112 before being sensed by a receiver 110. An example of a water layer multiple is shown starting at raypath 130. Seismic waves are generated by a seismic source 108 and a portion of the waves travels downward through the body of water 106 along raypath 130. A portion of the seismic waves reflects from the water bottom 112 and travels back upward through the body of water 106 along raypath 132. A portion of the reflected waves reflects from the water surface 116 and travels back downward through the body of water 106 along raypath 134. A portion of the twice-reflected waves reflects again from the water bottom 112 and travels back upward through the body of water 106 along raypath 136. A portion of the thrice-reflected waves reflects again from the water surface 116 and travels back downward through the body of water 106 along raypath 138. A portion of the four times reflected waves reflects again from the water bottom 112 and travels back upward through the body of water 106 along raypath 140. A portion of the five times reflected waves reflects again from the water surface 116 and travels back downward through the body of water 106 along raypath 142. A portion of the six times reflected waves reflects again from the water bottom 112 and travels back upward through the body of water 106 along raypath 144. The seven times reflected waves then travel past a receiver 110, which detects the waves and generates a representative signal. The water layer multiple starting at raypath 130 is a simple water layer multiple since the seismic waves never go below the water bottom 112, i.e., they remain within the water layer or body of water 106. The water layer multiple starting at raypath 130 is a multiple of order three, since the multiple contains three reflections from the water surface 116.

A water layer multiple that goes below the water bottom 112 is often referred to as a peg-leg water layer multiple. FIG. 1 illustrates an example of a peg-leg water layer multiple starting at raypath 150. Seismic waves are generated by a seismic source 108 and a portion of the waves travels downward through the body of water 106 and into the subterranean formation 102 along raypath 150. A portion of the seismic waves reflects from the water bottom 112 and travels back upward through the body of water 106 along raypath 152. A portion of the reflected waves reflects from the water surface 116 and travels back downward through the body of water 106 and into the subterranean formation 102 along raypath 154. A portion of the twice-reflected waves reflects from the interface 114 and travels back upward through the formation 102 and the body of water 106 along raypath 156. A portion of the thrice-reflected waves reflects again from the water surface 116 and travels back downward through the body of water 106 along raypath 158. A portion of the four times reflected waves reflects again from the water bottom 112 and travels back upward through the body of water 106 along raypath 160. A portion of the five times reflected waves reflects again from the water surface 116 and travels back downward through the body of water 106 along raypath 162. A portion of the six times reflected waves reflects again from the water bottom 112 and travels back upward through the body of water 106 along raypath 164. The seven times reflected waves then travel past a receiver 110, which detects the waves and generates a representative signal. The peg-leg water layer multiple starting at raypath 150 is a multiple of order three, since the multiple contains three reflections from the water surface 116. One of the three reflections from the water surface 116 is located on the source 108 side, while the other two are located on the receiver 110 side.

Figure 2:
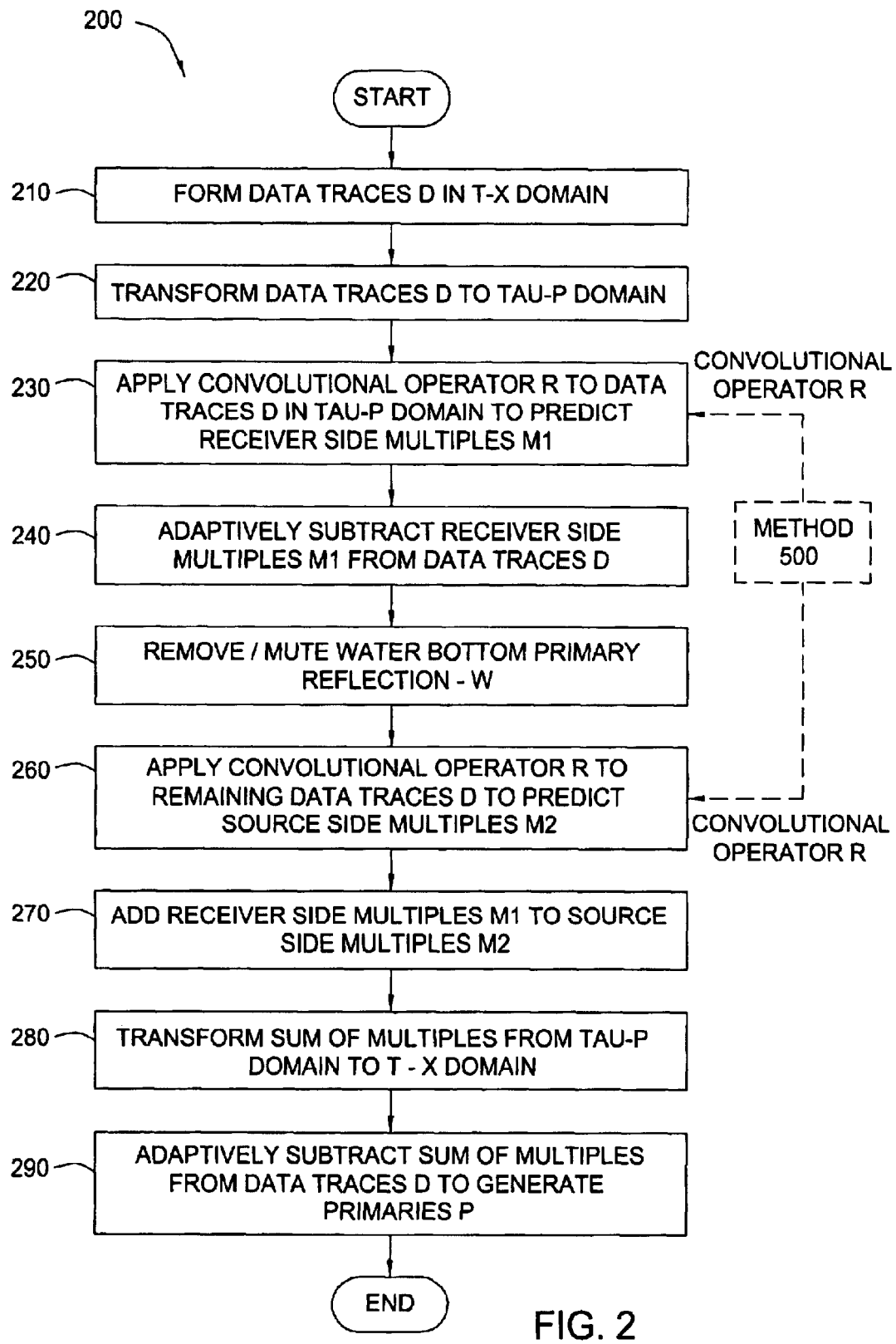
FIG. 2 illustrates a method for attenuating water layer multiples from a gather of seismic data traces in accordance with one embodiment of the invention.

FIG. 2 illustrates a method 200 for attenuating water layer multiples from a gather of seismic data traces D in accordance with one embodiment of the invention. The data traces D may be sorted into gathers, such as shot gathers, common mid-point gathers or receiver gathers. A shot gather is defined as the subset of data traces having a common shot (source) location. The gather of seismic data traces D contains the water bottom primary reflection, a complete set of the subsurface primary reflections and all their associated water layer (and other) multiple reflections. As such, the gather of data traces D may be represented as $$D = W/(1+R) + P/(1+R)^2 \qquad (1)$$

where P represents the primary reflections (except the water bottom primary) and all non-water layer multiples in the gather of seismic data traces D; R represents a convolutional or reflectivity operator, which consists of a time shift factor, which is equal to the two-way travel time in the body of water or water layer 106, and an amplitude factor, which is equal to the water bottom reflectivity; W represents the water bottom primary reflection in the gather of seismic data traces D; $P/(1+R)^2$ represents the primary reflections (except the water bottom primary) and all the associated multiples, including the source side and receiver side water layer multiples; $(1+R)^2$ is generally recognized as the Backus operator; and $W/(1+R)$ represents the water bottom primary reflection and all the associated water layer multiples. Equation (1) is applicable in the t-x domain at zero offset, or in the tau-p domain for each value of the ray parameter p. When applied in the tau-p domain, however, the time shift factor associated with R is the intercept time tau associated with the water bottom primary reflection W.

Equation (1) may be rewritten as $$W + P = D - M1 - M2 \qquad (2)$$

where M1=RD and M2=R (D−M1−W). M1 represents a subset of the water-layer multiples equivalent to the receiver side multiples, such that (D−M1−W) represents the recorded data traces with the receiver side multiples M1 and the water bottom primary reflection W removed. M2 represents the remaining multiples, i.e., the source side multiples. W+P represents the primary data, i.e., events that are not water layer multiples, which is the object of the present invention. An event is generally defined as the recorded pressure fluctuations that are associated with a seismic wave passing the receiver 110. Typically these pressure fluctuations are of short duration (tens of milliseconds) compared to the time taken for the seismic wave to travel from the source 108 to the receiver 110 (hundreds of milliseconds to several seconds). So, these pressure fluctuations generally appear as distinct recordings on the seismic data trace. The time of the event would normally be the time of the onset of the pressure fluctuations. An event can be a primary or a multiple.

Referring back to FIG. 2, at step 210, the gather of seismic data traces D are formed in the t-x domain, where t stands for the amount of travel time of the seismic waves from the source 108 to the receiver 110, and x stands for the offset distance, i.e., the horizontal distance, between the source 108 and the receiver 110.

Figure 3:
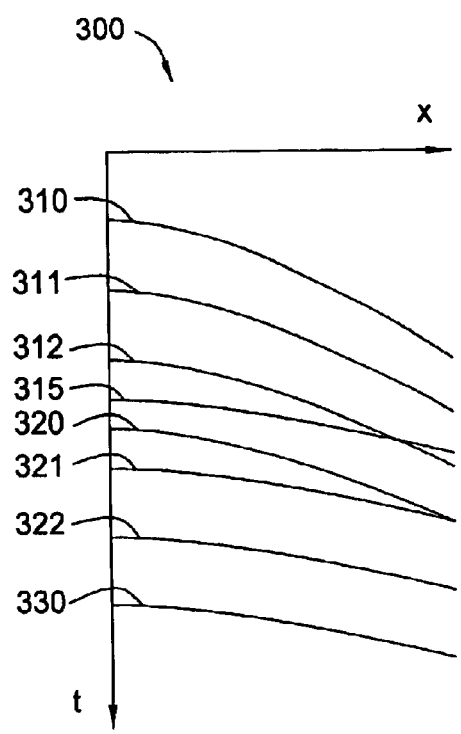
FIG. 3 illustrates a formation of the seismic data traces in the t-x domain in accordance with one embodiment of the invention.

A formation 300 of the seismic data traces D in the t-x domain is illustrated in FIG. 3. The vertical axis represents the amount of travel time (t) as described above, with the amount of travel time increasing in the downward direction. The horizontal axis represents the offset distance (x) between the source 108 and the receiver 110. The curves in the formation 300 indicate the times at which the reflections are recorded for each event as a function of x. Curve 310 represents the primary reflection from the water bottom. Curves 311 and 312 represent the first and second order simple water layer multiples. Curve 320 represents the third order simple water layer multiple shown in FIG. 1 as raypaths 130–144. Curve 315 represents the primary reflection from interface 114, shown in FIG. 1 as raypaths 120 and 122. Curve 330 represents the third order peg-leg water layer multiple shown in FIG. 1 as raypaths 150–164. Curve 321 represents the first order peg-leg water layer multiple and curve 322 represents the second order peg-leg water layer multiple.

Figure 4:
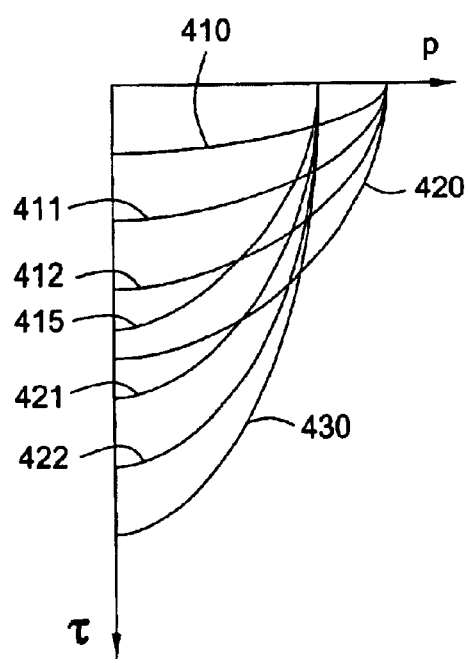
FIG. 4 illustrates a formation of the seismic data traces in the tau-p domain in accordance with one embodiment of the invention.

Referring back to FIG. 2, at step 220, the seismic data traces D are transformed to a tau-p domain by a linear Radon transform. In this manner, analysis using equation (1) may be applied to non zero offset data. A formation 400 of the data traces D in the tau-p domain is illustrated in FIG. 4. The vertical axis represents tau, which is the time at which the straight line defined by tau and p intercepts the zero-offset axis in the t-x domain, and is the same as the zero offset time of the event when p=0. The horizontal axis represents the ray parameter p, which is related to the angle between the raypath and the vertical direction. Curves 410, 411, 412, 415, 420, 421, 422 and 430 in the tau-p domain correspond to curves 310, 311, 312, 315, 320, 321, 322 and 330 in the t-x domain, respectively.

Figure 5:
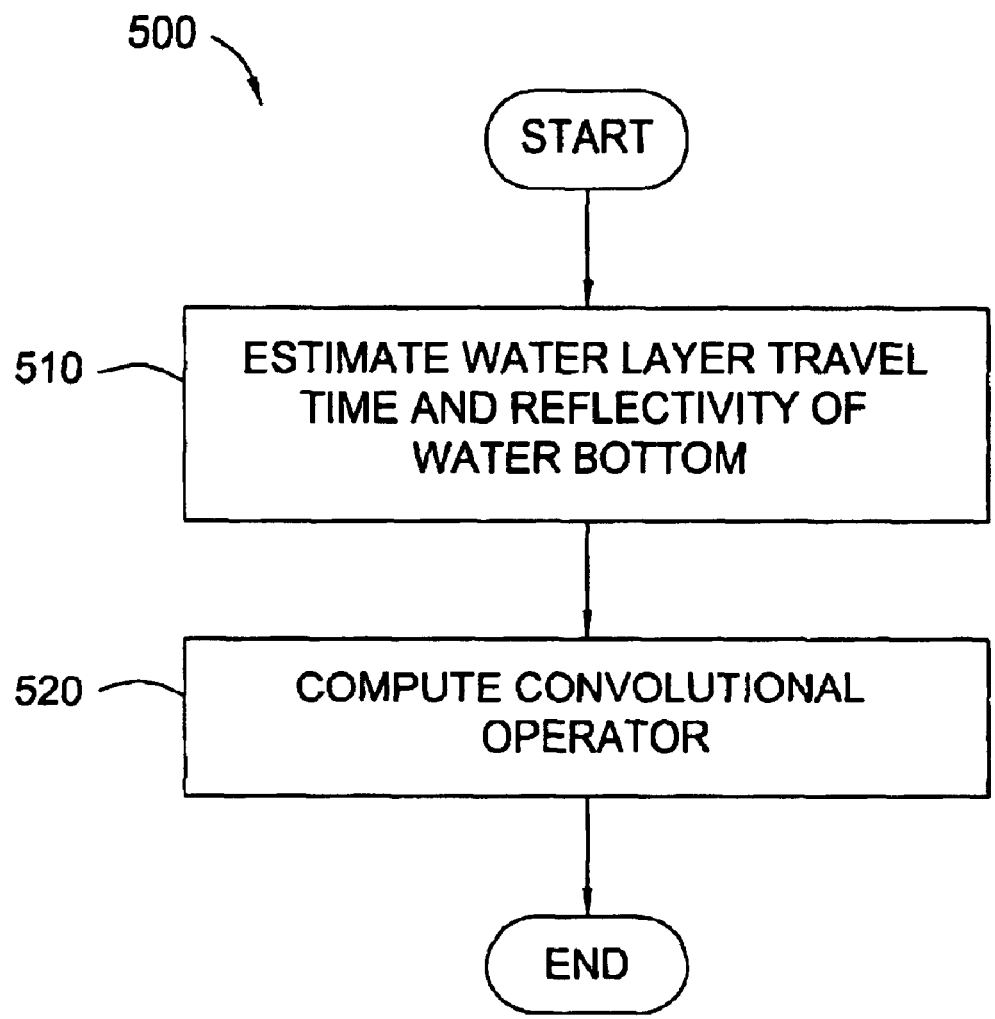
FIG. 5 illustrates a method for deriving the convolutional or reflectvity operator in accordance with one embodiment of the invention.

At step 230, the convolutional or reflectivity operator R is applied to the gather of seismic data traces D to generate an estimated value of M1, which represents the receiver side water layer multiples in the gather of seismic data traces D. That is, the gather of seismic data traces D are convolved with the convolutional operator R to predict a value of the receiver side water layer multiples M1. In this manner, the value of the receiver side water layer multiples M1 is deterministically predicted. The convolutional operator R may be derived from a method 500 described in FIG. 5.

The following paragraph describes the method 500 for deriving the convolutional or reflectivity operator R in accordance with one embodiment of the invention. At step 510, the zero offset two-way travel time in the water layer and the reflectivity at the water bottom 112 are estimated from a water layer model. The zero offset travel time in the water layer may also be picked from autocorrelations of moveout-corrected, near offset data traces. The reflectivity at the water bottom 112 may be scalar, which would represent a hard water bottom, defined as being a sudden transition from water to a reasonable homogeneous material. The reflectivity at the water bottom 112 may also be based on a time series. A time series is generally used for the water bottom reflectivity if the water bottom is transitional, i.e. consisting of many sedimentary layers. The reflectivity at the water bottom 112 may also be made p dependent. For each p, the water bottom reflectivity and the zero offset travel time in the water layer are estimated.

At step 520, the convolutional or reflectivity operator R is computed based on the estimated values of the zero offset travel time in the water layer and the reflectivity at the water bottom 112. The convolutional operator R is generally computed in the tau-p domain. In one embodiment, the convolutional operator R is the water bottom reflectivity shifted in time by the time associated with the water layer. In the tau-p domain, the time associated with the water layer depends on ray parameter p and is equivalent to the time of the event W in FIG. 4. This time can be computed as an elliptical function of the zero-offset travel time and ray parameter p, given an estimate of the water velocity. For example, if the water bottom reflectivity is 0.5 and the travel time associated with the water layer for a given p is 200 ms, then the convolutional operator R would consist of a spike of amplitude 0.5 at time 200 ms. Since the water time and the reflectivity estimates are derived from a model, as opposed to a statistical derivation from the seismic data traces D themselves, the prediction of the multiples based on the convolutional operator R may be described as deterministic.

Referring back to FIG. 2, at step 240, the predicted value of the receiver side water layer multiples M1 are adaptively subtracted from the seismic data traces D. The receiver side water layer multiples M1 may be adaptively subtracted from the seismic data traces D using a least mean squares or least squares adaptive filtering algorithm. The adaptive subtraction may be configured to allow for errors in the estimated values of zero offset travel time and the reflectivity at the water bottom 112. In one embodiment, since the receiver side water layer multiples M1 and the source side water layer multiples M2 generally contain the same events but with different amplitudes, both the receiver side water layer multiples M1 and the source side water layer multiples M2 may be adaptively subtracted from the data traces D by using a more aggressive adaptive filter algorithm. In such a case, processing continues to step 280 with the predicted receiver side multiples replacing the summed multiples.

The following steps address the nonlinear dependence of the multiples on the reflectivity. At step 250, the water bottom primary reflection W is removed or muted from the gather of seismic data traces D. By removing the water bottom primary reflection W, each amplitude associated with the water bottom primary is replaced with zero. In one embodiment, this step may be accomplished by muting a zone of seismic data traces in the tau-p domain that contain the water bottom primary reflection W. The water bottom primary reflection W may also be removed by other methods, such as creating a model of the water bottom primary reflection W and subtracting it from the gather of seismic data traces D, or other filtering methods generally known by persons of ordinary skill in the industry.

At step 260, the convolutional or reflectivity operator R (which is derived from the method 500 described above) is applied to or convolved with the seismic data traces after the receiver side water layer multiples M1 have been adaptively subtracted from the seismic data traces D and the water bottom primary has been removed from the seismic data traces D. This convolution generates an estimated value of M2, which represents the source side water layer multiples. In this manner, the value of source side water layer multiples M2 is deterministically predicted.

At step 270, the receiver side water layer multiples M1 are added to the source side water layer multiples M2 to generate all the water layer multiples M in the recorded data traces D. At step 280, all the water layer multiples M are transformed from the tau-p domain to the t-x domain by an inverse Radon transform. At step 290, all the water layer multiples M are adaptively subtracted from the seismic data traces D to generate the primary reflections P in the seismic data traces. In another embodiment, all the water layer multiples M may remain in the tau-p domain and be adaptively subtracted from the seismic data traces D, followed by transforming the result of the adaptive subtraction to the t-x domain.

While the foregoing is directed to embodiments of the present invention, other and further embodiments of the invention may be devised without departing from the basic scope thereof, and the scope thereof is determined by the claims that follow.

What is claimed is:

1. A method for attenuating water layer multiples from a gather of seismic data traces, comprising:

applying a convolutional operator to the gather of seismic data traces to predict a plurality of receiver side water layer multiples contained in the gather of seismic data traces;

adaptively subtracting the receiver side water layer multiples from the gather of seismic data traces to generate a modified version of the gather of seismic data traces;

removing a water bottom primary from the modified version of the gather of seismic data traces to create a second modified version of the gather of seismic data traces;

applying the convolutional operator to me second modified version of the gather of seismic data traces to predict a plurality of source side water layer multiples contained in the gather of seismic data traces; and adaptively subtracting the receiver side water layer multiples and the source side water layer multiples from the gather of seismic data traces to generate a plurality of primaries contained in the gather of seismic data traces.

2. The method of claim 1, wherein applying the convolutional operator to the gather of seismic data traces to predict the plurality of receiver side water layer multiples comprises:

forming the gather of seismic data traces in a t-x domain;

transforming the gather of seismic data traces from the t-x domain to a tau-p domain; and convolving the gather of seismic data traces with the convolutional operator to predict the receiver side water layer multiples.

3. The method of claim 1, wherein applying the convolutional operator to the second modified version of the gather of seismic data traces to predict the source side water layer multiples comprises:

convolving the convolutional operator with the second modified version of the gather of seismic data traces to predict the source side water layer multiples.

4. The method of claim 2, wherein the gather of seismic data traces is transformed to the tau-p domain using a linear Radon transform.

5. The method of claim 1, wherein adaptively subtracting the receiver side water layer multiples and the source side water layer multiples from the gather of seismic data traces comprises:

adding the receiver side water layer multiples to the source side water layer multiples; and transforming the sum of the receiver side water layer multiples and the source side water layer multiples from the tau-p domain to the t-x domain.

6. The method of claim 5, wherein adaptively subtracting the receiver side water layer multiple and the source side water layer multiples from the gather of seismic data braces comprises adaptively subtracting the sum of the receiver side water layer multiples and the source side water layer multiples in the t-x domain to generate the primaries contained in the gather of seismic data traces in the t-x domain.

7. The method of claim 1, wherein removing the water bottom primary comprises replacing each amplitude associated with the water bottom primary with zero.

8. The method of claim 5, wherein the sum of the receiver side water layer multiples and the source side water layer multiples is transformed to the t-x domain using an inverse linear Radon transform.

9. The method of claim 1, wherein the convolutional operator is computed using a zero offset two-way travel time in a water layer and a reflectivity at a water bottom estimated from the water layer model.

10. The method of claim 9, wherein the convolutional operator is the estimated value of the water bottom reflectivity shifted in time by the estimated value of the travel time in the water layer in the tau-p domain.

11. The method of claim 1, wherein the convolutional operator is derived from a water layer model.

12. A method for attenuating water layer multiples from a gather of seismic data traces, comprising:

forming the gather of seismic data traces in a t-x domain;

transforming the gather of seismic data traces from the t-x domain to a tau-p domain;

convolving the gather of seismic data traces with a convolutional operator to predict a first set of water layer multiples contained in the gather of the seismic data traces;

adaptively subtracting the first set of water layer multiples from the gather of seismic data traces;

removing a water bottom primary from the gather of seismic data traces;

convolving the convolutional operator with the gather of seismic data traces after the first set of water layer multiples has been adaptively subtracted from the seismic data traces and after the water bottom primary has been removed from the gather of seismic data traces to predict a second set of water layer multiples contained in the gather of seismic data traces;

adding the first set of water layer multiples to the second set of water layer multiples;

transforming the sum of the first set of water layer multiples and the second set of water layer multiples from the tau-p domain to the t-x domain; and adaptively subtracting the transformed sum of the first set of water layer multiples and the second set of water layer multiples from the gather of seismic data traces in the t-x domain to generate a plurality of primaries contained in the gather of seismic data traces.

13. The method of claim 12, wherein the first set of water layer multiples comprises one or more receiver side water layer multiples.

14. The method of claim 12, wherein the second set of water layer multiples comprises one or more source side water layer multiples.

15. The method of claim 12, wherein removing the water bottom primary comprises replacing each amplitude associated with the water bottom primary with zero.

16. The method of claim 12, wherein the plurality of seismic data traces is transformed to the tau-p domain using a linear Radon transform.

17. The method of claim 12, wherein the convolutional operator is derived from a water layer model.

18. The method of claim 12, wherein the convolutional operator is derived from a zero offset two-way travel time in the water layer and reflectivity at a water bottom estimated from a water layer model.

19. The method of claim 18, wherein the convolutional operator is the estimated value of the water bottom reflectivity shifted in time by the estimated value of the travel time in the water layer in the tau-p domain.

20. A method for attenuating water layer multiples from a gather of seismic data traces, comprising:

forming the gather of seismic data traces in a t-x domain;

transforming the gather of seismic data traces to a tau-p domain;

applying a convolutional operator to the gather of seismic data traces to predict a plurality of receiver side water layer multiples contained in the gather of seismic data traces;

adaptively subtracting the receiver side water layer multiples from the gather of seismic data traces to generate a modified version of the gather of seismic data traces;

removing a water bottom primary from the modified version of the gather of seismic data traces to create a second modified version of the gather of seismic date traces;

applying the convolutional operator to the second modified version of the gather of seismic data traces to predict a plurality of source side water layer multiples contained in the gather of seismic data traces;

adding the receiver side water layer multiples to the source side water layer multiples;

transforming the sum of the receiver side water layer multiples and the source side water layer multiples from the tau-p domain to a t-x domain; and adaptively subtracting the receiver side water layer multiples and the source side water layer multiples from the gather of seismic data traces to generate a plurality of primaries contained in the gather of seismic data traces.

* * * * *

UNITED STATES PATENT AND TRADEMARK OFFICE
CERTIFICATE OF CORRECTION

PATENT NO. : 6,832,161 B1
DATED : December 14, 2004
INVENTOR(S) : Ian Moore

It is certified that error appears in the above-identified patent and that said Letters Patent is hereby corrected as shown below:

<u>Column 9,</u>
Line 5, "applying the convolutional operator me second modi-" should read:
-- applying the convolutional operator to the second modi- --

Signed and Sealed this

First Day of March, 2005

JON W. DUDAS
*Director of the United States Patent and Trademark Office*